US010896091B2

(12) United States Patent
Zhang et al.

(10) Patent No.: US 10,896,091 B2
(45) Date of Patent: Jan. 19, 2021

(54) MANAGING SUPERPARITY STORAGE LOCATION USAGE AND COVERAGE

(71) Applicant: Seagate Technology LLC, Cupertino, CA (US)

(72) Inventors: Wei Zhang, Singapore (SG); Xiong Liu, Singapore (SG); Choon Wei Ng, Singapore (SG); Zhi Ye, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 63 days.

(21) Appl. No.: 16/426,773

(22) Filed: May 30, 2019

(65) Prior Publication Data

US 2020/0379845 A1 Dec. 3, 2020

(51) Int. Cl.
*G06F 11/10* (2006.01)
*G06F 3/06* (2006.01)

(52) U.S. Cl.
CPC ........ *G06F 11/1076* (2013.01); *G06F 3/0604* (2013.01); *G06F 3/0644* (2013.01); *G06F 3/0673* (2013.01)

(58) Field of Classification Search
CPC .................................................. G06F 11/1076
USPC ......................... 714/764, 765, 767, 770, 762
See application file for complete search history.

(56) References Cited

U.S. PATENT DOCUMENTS

| | | | | |
|---|---|---|---|---|
| 7,536,625 | B2 | 5/2009 | Seng et al. | |
| 8,756,399 | B2 | 6/2014 | Feldman | |
| 9,043,690 | B2 | 5/2015 | Hauske et al. | |
| 9,391,639 | B2 | 7/2016 | Varnica et al. | |
| 9,489,260 | B1 | 11/2016 | Hong et al. | |
| 9,632,865 | B1 * | 4/2017 | Michel | G06F 11/1076 |
| 10,049,698 | B2 | 8/2018 | Zhu et al. | |
| 10,108,481 | B1 | 10/2018 | Kataria et al. | |
| 2006/0005068 | A1 | 1/2006 | Keeler et al. | |
| 2007/0150774 | A1 * | 6/2007 | Seng | G11B 20/1217 714/699 |
| 2017/0322844 | A1 | 11/2017 | Hong et al. | |

OTHER PUBLICATIONS

Wildani, Avani et al., “Protecting Against Rare Event Failures in Archival Systems”, Storage Systems Research Center, University of California, Santa Cruz; Computer Engineering Department, Santa Clara University; research supported by the Petascale Data Storage Institute under Department of Energy award DE-DC02-06ER25768 and industrial sponsors; 11 pages.

* cited by examiner

*Primary Examiner* — Fritz Alphonse
(74) *Attorney, Agent, or Firm* — Westman, Champlin & Koehler, P.A.

(57) ABSTRACT

A method includes storing a superset of data on a data storage medium along with a corresponding superset superparity. The superset of data includes multiple sets of data, and the corresponding superset superparity is calculated based on all of the multiple sets of data. The method also includes updating at least one subset of the superset of data. The subset has a subset superparity. The superset superparity is updated with the subset superparity, and the subset superparity and a location of the subset within the superset are employed to carry out error correction operations.

20 Claims, 5 Drawing Sheets

300

302 STORE DATA SUPERSET AND SUPERSET SUPERPARITY

304 EMPLOY SUPERSET SUPERPARITY FOR ERROR CORRECTION

306 UPDATE A SUBSET OF THE DATA SUPERSET

308 UPDATE THE SUPERSET SUPERPARITY WITH THE SUBSET SUPERPARITY

310 STORE A LOCATION OF THE SUBSET WITHIN THE SUPERSET

312 EMPLOY THE SUBSET SUPERPARITY AND THE LOCATION FOR ERROR CORRECTION 100
102
PROCESSOR
103
SYSTEM BUS
104
I/0 DEVICES
106
VOLATILE MEMORY
108
110
CONTROLLER
122
124
128
112
113
126
116
114
116A
116N
116S
114A
114N
114S
115
116A
114
114A
116S
114S
114N
116N
116
120

MANAGING SUPERPARITY STORAGE LOCATION USAGE AND COVERAGE

SUMMARY

In one embodiment, a method includes storing a superset of data on a data storage medium along with a corresponding superset superparity. The superset of data includes multiple sets of data, and the corresponding superset superparity is calculated based on all of the multiple sets of data. The method also includes updating at least one subset of the superset of data. The subset has a subset superparity. The superset superparity is updated with the subset superparity, and the subset superparity and a location of the subset within the superset are employed to carry out error correction operations.

In another embodiment, an apparatus includes a data storage medium including at least one superblock having a user data field, a superparity storage field, and a data location storage field. The apparatus also includes a controller configured to store first user data in an entire portion of the first user data field, and a first superparity for the first user data in the superparity storage field. The controller is further configured to store second user data in a sub-portion of the user data field, a second superparity for the second user data in the superparity storage field, and a location of the second user data in the data location storage field.

In yet another embodiment, a method includes providing a user data field. The method also includes employing a same superparity storage field to store a first superparity corresponding to first user data that occupies an entire portion of the user data field and to store a second superparity corresponding to second user data that occupies a sub-portion of the user data field.

This summary is not intended to describe each disclosed embodiment or every implementation of managing superparity storage location usage and coverage as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Figures 1A, 1B:
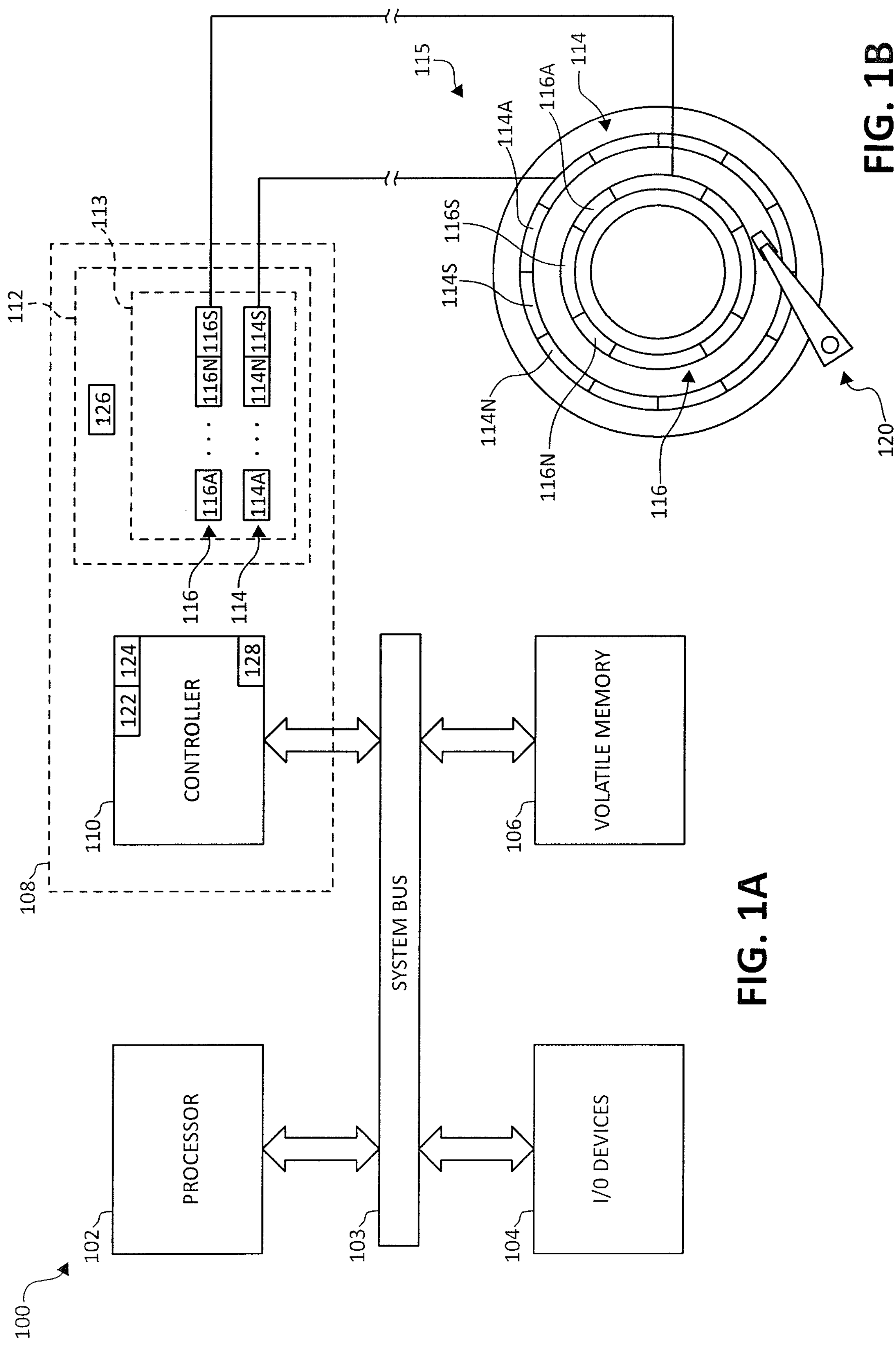
FIG. 1A is a simplified block diagram of an illustrative embodiment of a system of data storage management.
FIG. 1B shows a representative disc of a disc drive on which embodiments of the present disclosure may be practiced.
Figure 2:
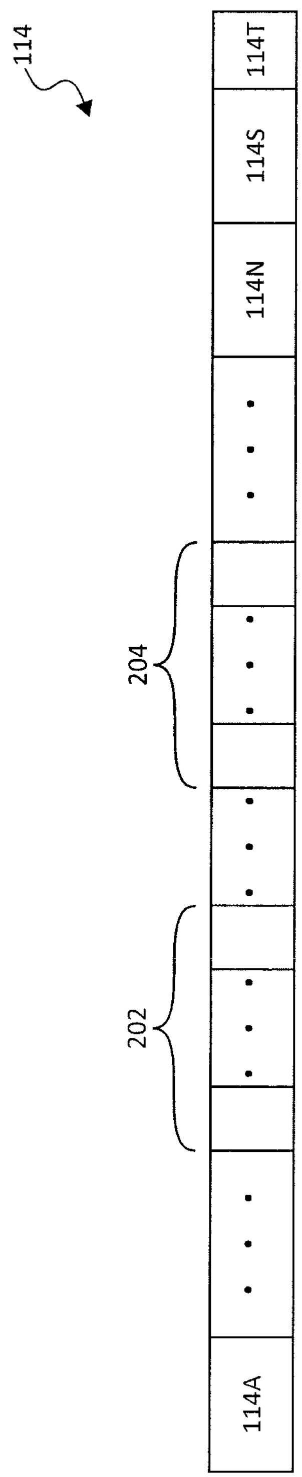
FIG. 2 is a diagrammatic illustration of an example track.

Embodiments of the disclosure relate to managing superparity storage location usage and coverage in data storage devices.

In general, a superparity may be calculated for a superset of data that includes multiple sets of data. For example, in a disc drive, a track may be logically divided into sectors, and data on the track stored in the sectors. Each sector may have a corresponding parity that may be used to recover data in the individual sector associated with the parity. The sectors making up a track may be used to calculate a superparity for the track. The superparity for the track protects the superset of data corresponding to the track. A superparity for a track may be stored at the end of a track. Such a superparity may be referred to as a track-based superparity. Another type of superparity is iso-based superparity, which involves calculating a superparity for a specific size of superblock.

In the event of a write to, for example, a sector of a track, the track-based superparity stored at the end of the track becomes invalid until a new superparity for the whole track is calculated. In general, when tracks are partially written, track-based superparities for the tracks may be determined and updated during an "idle time" of the storage device. To protect track data rendered unprotected by an invalid track-based superparity or other superparity, an intermediate superparity may be calculated for data read or written by the storage device. In conventional disc drives, the intermediate superparity is typically stored in a separate memory (e.g., a dynamic random access memory (DRAM)) or a media cache, and the invalid track-based superparity value remains stored at the end of the track until a next idle-time update with the new superparity.

Embodiments of the disclosure recognize that retaining the invalid superparity value at the end of the track until the next idle-time update is unnecessary, and that the use of the separate memory or media cache can be avoided. Details regarding the different embodiments are provided below in connection with FIGS. 1A-5.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Referring to FIG. 1A, a particular embodiment of a system of data storage management is shown and generally designated 100. The system of data storage management 100 may include a processor 102 connected to a system bus 103 which also can be connected to input/output (I/O) devices 104, such as a keyboard, monitor, modem, storage device, or pointing device. The system bus 103 may also be coupled to a memory 106, which may be a random access volatile memory. The system bus may additionally be coupled to a data storage device 108.

The data storage device 108 may include a controller 110, which may be coupled to the processor 102 via a connection through the system bus 103. In one embodiment, the data storage device 108 comprises at least one storage entity 112. In a particular embodiment, storage entity 112 includes one or more memories or data storage media. As shown in FIG. 1A, storage entity 112 is further organized as a main store 113, such as one or more platters or discs 115 of a disk drive as shown in FIG. 1B. In a disc drive, a head 120 communicates with the data storage platter or disc 115. The main store 113 may include a plurality of storage elements 114 (having storage units 114A-114N), 116 (having storage units 116A-116N), etc. (e.g., a first track 114 (having sectors 114A-114N) and a second track 116 (having sectors 116A-116N) shown in FIG. 1B). A indicated above, in some embodiments, data in each of storage units (e.g., sectors) 114A-114N and 116A-116N may have a corresponding parity that may be used to recover data in the individual storage unit (e.g., sector) associated with the parity. Further, as noted above, superparities are calculated for data stored in storage elements (e.g., tracks) 114 and 116, respectively, and may be stored at the end (or in any other suitable location) of the storage element (e.g., track) 114, 116. In FIGS. 1A and 1B, 114S and 116S are superparity storage fields of storage elements 114 and 116, respectively. Superparities may be calculated and updated by a superparity management module 122, and an error correction module 124 may utilize the superparities for data recovery operations. A parity validity table 126 may be employed to store parity validity flags that indicate whether the superparities stored in, for example, 114S and 116S are valid. Further, registers 128 may be included for temporary storage of location information for data stored in storage elements 114 and 116. The use of the data location information for superparity-related operations is described in detail further below. An example track 114 having N user data sectors 114A-114N and one or more superparity storage fields 114S is described below in connection with FIG. 2 to explain embodiments of the disclosure.

A starting assumption is that N=100 and that the 100 user data sectors are written with data. It is also assumed that superparity storage field 114S has a first superparity value for the 100 written sectors stored therein. In the event of a write to, for example, user data sectors 20-30 (denoted by reference numeral 202 in FIG. 2), the track-based first superparity value stored in the superparity storage field 114S becomes invalid.

As indicated above, in current systems, a separate memory or media cache is used to store a second superparity value for updated user data sectors 20-30, and the invalid first superparity value remains stored on the track in the superparity storage field 114S.

As noted above, embodiments of the disclosure recognize that retaining the invalid first superparity value in the superparity storage field is unnecessary, and therefore overwrite/update the superparity storage field 114S with the second superparity value and also store the location of the updated user data sectors (e.g., using an offset calculated form the beginning of the track (e.g., beginning at sector 114A) and a length (e.g., a number of sectors in, for example, 202). The location information may be stored in location storage field 114T. In some embodiments, location storage field 114T may be substantially smaller than superparity storage field 114S. In a particular embodiment, superparity storage field 114S may include two track sectors and location storage field 114T may be a few bytes. In some embodiments, location storage field 114T may be a part of superparity field 114S (e.g., 114S and 114T may be combined). In the example of 100 sectors, the offset is used to locate sector 20 and the length is used to indicate that the second superparity value is valid for sectors 20-30. It should be noted that this technique may be used for writes to multiple non-overlapping groups of sectors (e.g., 20-30, 50-70 (denoted by reference numeral 204 in FIG. 2), etc.) by storing different superparity values for the different groups/subsets of sectors and corresponding location information for the different groups/subsets.

In the above example, which assumes that the superparity storage field 114S has a first superparity value for the 100 written sectors stored therein, updating data in even one sector (e.g., 114A) results in the first superparity value becoming invalid. As indicated above, a single sector (e.g., 114A) may include user data and parity data together. When the single sector (e.g., 114A) is updated and the remaining sectors (e.g., 114B-114N) are not updated, the subset includes the single sector (e.g., 114A), and the superparity storage field 114S may be updated to include the parity information of the single sector. In this case, the parity information in sector 114A and the superparity information in field 114S may be the same. However, when data in more than one sector is updated, the calculated superparity value for the multiple sectors may be different from the parity value of any individual sector of the multiple sectors.

Figure 3:
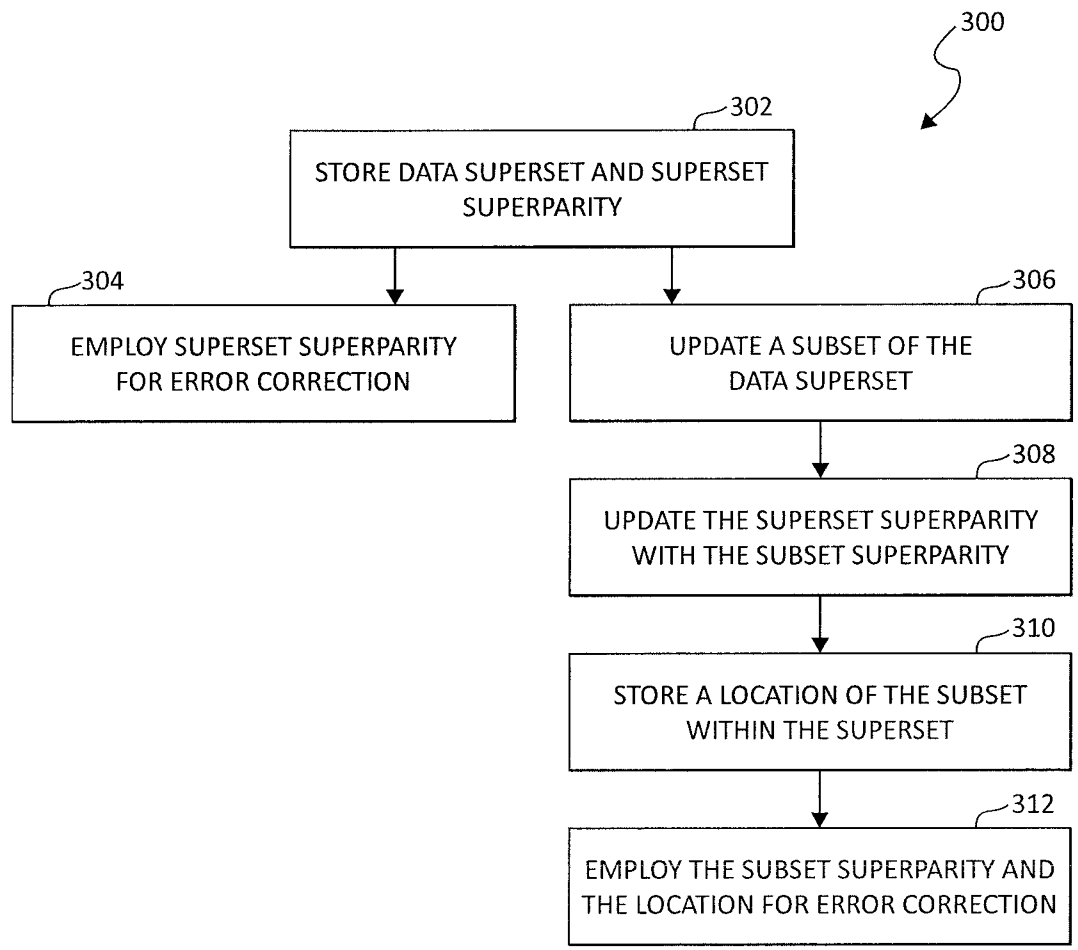
FIG. 3 is a flow diagram of one method embodiment.

FIG. 3 is a flow diagram of a method 300 in accordance with one embodiment. At 302, a superset of data is stored on a data storage medium along with a corresponding superset superparity. At 304, the superset superparity is employed to carry out data recovery operations when errors are encountered when reading at least a portion of the stored superset of data. It should be noted that the superset superparity may be employed for data recovery operations as long as no updates to the superset of data are carried out after the calculation of the superset superparity. At 306, at least one subset of the superset of data is updated. At 308, a subset superparity is calculated for the updated subset, and the superset superparity is updated with the subset superparity. At 310, a location of the subset within the superset is stored. At 312, the subset superparity and the location of the subset within the superset are employed to carry out data recovery operations when errors are encountered when reading data within the updated subset. Location information of the subset may be temporarily stored in registers 128 (of FIG. 1) when write operations are performed to generate subset superparity or when data recovery operations of method 300 are carried out.

Figure 4A:
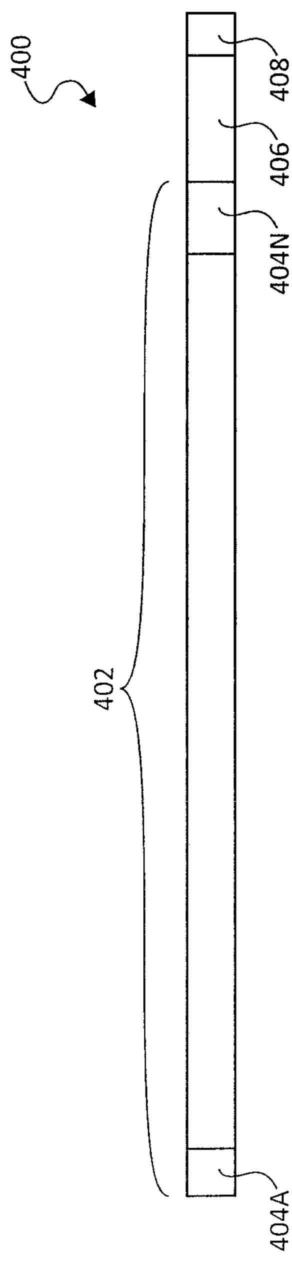
FIGS. 4A and 4B are diagrammatic illustrations of example tracks.
Figure 4B:
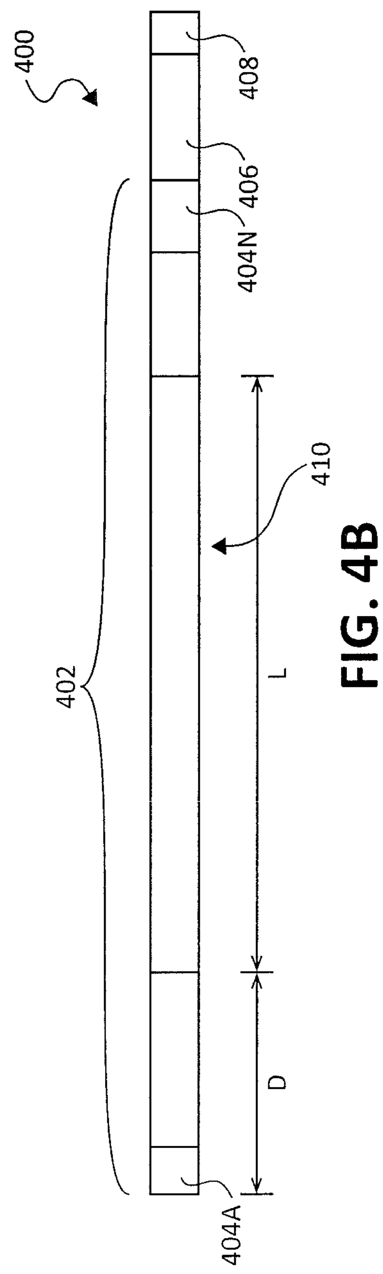

From the above method, it is seen that the superset superparity may be utilized when the superset of data is not updated after the superset superparity is calculated, and the subset superparity may be utilized when a portion of the superset of data is updated. Thus, for a superblock (e.g., a track), full or partial superparity protection may be provided in accordance with embodiments of the disclosure. FIGS. 4A and 4B together illustrate an example embodiment for providing both full and partial superparity by utilizing a common or unified parity protection scheme. In the example of FIGS. 4A and 4B, a superblock (e.g., the track) 400 includes a user data field 402 including a plurality of user data sectors 404A-404N, a superparity storage field 406, and a data location field 408. As indicated above in connection with FIG. 1A, the parity validity table (e.g., 126 of FIG. 1) stored in any suitable memory in the data storage device is employed to identify whether the full superparity (e.g., the superset superparity) for the particular track 400 is valid.

FIG. 4A illustrates a full track write condition (e.g., data written to the entire user data field 402 starting from a track start location (e.g., user data sector 404A) and ending at a user data field 402 end location (e.g., user data sector 404N).

In this case, the full superparity for the user data field 402 is stored in superparity storage field 406. Also, an offset from user data sector 404A, which is 0 for the full track write, and a length, which is a number of user data sectors N in the user data field 402, are stored in data location storage field 408. Parity validity table 126 information for track 400 indicates that the full superparity or superset superparity is valid (e.g., by storing a status of "1" for track 400).

FIG. 4B illustrates a partial track write condition (e.g., data written to a subset 410 of user data sectors 404A-404N of the user data field 402). As can be in FIG. 4B, the partial write starts at D sectors away from the track start location and has a length of L sectors. Offset D and length L are stored in data location storage field 408 and the partial or subset superparity for data stored in the L sectors in stored in superparity storage field 406. The parity validity table 126 information for track 400 indicates that the full superparity or superset superparity is invalid (e.g., by storing a status of "0" for track 400).

Figure 5:
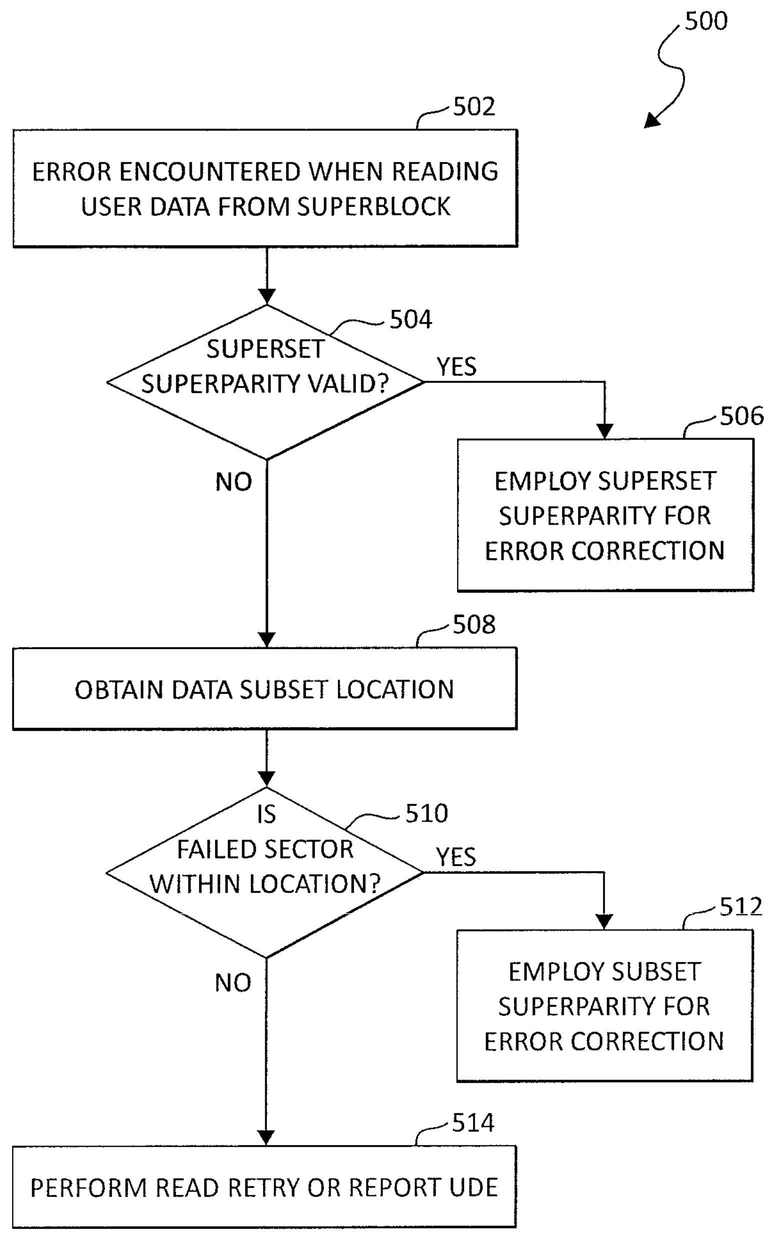
FIG. 5 is a flow diagram of another method embodiment.

FIG. 5 is a flowchart for a data recovery method 500 that employs the superparity protection scheme described above in connection with FIGS. 4A and 4B. At 502, an error is encountered when reading user data from a superblock (e.g., when reading from user data field 402 of FIG. 4). At 504, as part of a data recovery operation, a determination is made as to whether a superset superparity stored in a superparity storage field (e.g., 406 of FIG. 4) is valid. As described above in connection with FIG. 4, the validity of the superset superparity may be determined from status information stored in parity validity table 126 of FIG. 1. If the status information indicates that the superset superparity is valid, the superset superparity is employed to carry out error correction operations at 506. If the status information in the parity validity table indicates that the superset superparity is invalid, control passes to 508. At 508, location information for data stored by a partial write operation to the superblock is obtained from, for example, data location storage field 408 of FIG. 4. At 510, a determination is made as to whether the read error(s) encountered are for data within the obtained location (e.g., within the user data sector 404 range(s) (e.g., 410) determined from the location information). If the read error(s) are for data within the obtained location, then at 512, the partial or subset superparity is obtained from the superparity storage field (e.g., 406 of FIG. 4) and utilized to carry out error correction. If the read error(s) are for data not within the obtained location, then at 514, a read retry operation may be carried out or an unrecoverable data error (UDE) may be reported. It should be noted that location information for data subsets may be temporarily stored in registers 128 (of FIG. 1) when write operations are performed to generate subset superparity or when different data recovery operations of method 500 are carried out.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:

storing a superset of data on a data storage medium of an apparatus along with a corresponding superset superparity, the superset of data including multiple sets of data, and the corresponding superset superparity calculated based on all of the multiple sets of data;

updating at least one subset of the superset of data, the at least one subset having a subset superparity;

updating the superset superparity with the subset superparity; and employing the subset superparity and a location of the at least one subset within the superset to carry out error correction operations.

2. The method of claim 1 and wherein the multiple sets of data that form the superset of data comprise at least two sets of data and the at least one subset comprises at least one of the multiple sets of data and less than all of the multiple sets of data.

3. The method of claim 1 and wherein the multiple sets of data that form the superset of data comprise at least two sets of data, and wherein the at least one subset comprises first and second disjoint subsets, with each of the first and second disjoint subsets comprising at least one set of data.

4. The method of claim 3 and wherein the subset superparity is a single superparity computed for both the first and second disjoint subsets.

5. The method of claim 3 and wherein the subset superparity comprises a first subset superparity computed for the first disjoint subset and a second subset superparity computed for the second disjoint subset.

6. The method of claim 1 and further comprising:

performing a read operation to recover a portion of the superset of data after the at least one subset is updated; and when a data recovery error is encountered:

determining whether the portion of the superset of data is within the updated subset; and employing the subset superparity and the location of the at least one subset within the superset to carry out error correction operations when the portion of the superset of data is within the updated subset.

7. An apparatus comprising:

a data storage medium comprising at least one superblock having a user data field, a superparity storage field, and a data location storage field; and a controller configured to store:

first user data in an entire portion of the user data field, and a first superparity for the first user data in the superparity storage field; and second user data in a sub-portion of the user data field, a second superparity for the second user data in the superparity storage field, and a location of the second user data in the data location storage field.

8. The apparatus of claim 7 and wherein the controller is further configured to employ the second superparity and the location of the second user data when carrying out a data recovery operation for any of the second user data.

9. The apparatus of claim 7 and wherein the controller is further configured to employ the first superparity when carrying out a data recovery operation for any of the first user data.

10. The apparatus of claim 7 and wherein the controller is configured to update the first user data with the second user data in the sub-portion, thereby leaving a remainder of the first user data in a remaining portion of the user data field.

11. The apparatus of claim 10 and wherein the controller is further configured to carry out a data recovery attempt on any of the remainder of the first user data without the first and second superparities.

12. The apparatus of claim 7 and wherein the controller is further configured to:

store third user data in the user data field such that the second user data and the third user data occupy different sub-portions of the user data field;

store a third superparity for both the second user data and the third user data; and store a location of the third user data in the data location storage field such that the location of the second user data and the location of the third user data occupy different sub-portions in the data location storage field.

13. The apparatus of claim 7 and wherein the superblock comprises a data storage track on a data storage disc.

14. A method comprising providing a user data field; and employing a same superparity storage field to store a first superparity corresponding to first user data that occupies an entire portion of the user data field and to store a second superparity corresponding to second user data that occupies a sub-portion of the user data field.

15. The method of claim 14 and further comprising storing a location of the second user data in a data location storage field.

16. The method of claim 15 and further comprising employing the second superparity and the location of the second user data when carrying out a data recovery operation for any of the second user data.

17. The method of claim 14 and further comprising employing the first superparity when carrying out a data recovery operation for any of the first user data.

18. The method of claim 14 and further comprising updating the first user data with the second user data in the sub-portion, thereby leaving a remainder of the first user data in a remaining portion of the user data field.

19. The method of claim 14 and further comprising carrying out a data recovery attempt on any of the remainder of the first user data without the first and second superparities.

20. The method of claim 15 and further comprising:

storing third user data in the user data field such that the second user data and the third user data occupy different sub-portions of the user data field;

storing a third superparity for both the second user data and the third user data; and storing a location of the third user data in the data location storage field such that the location of the second user data and the location of the third user data occupy different sub-portions in the data location storage field.

* * * * *